United States Patent [19]

Brewer

[11] Patent Number: 5,537,903
[45] Date of Patent: Jul. 23, 1996

[54] PORTABLE POWER SAW GUIDE AND SUPPORT

[76] Inventor: Albert E. Brewer, 15044 S. Culver, Victorville, Calif. 92392

[21] Appl. No.: 228,891

[22] Filed: Apr. 18, 1994

[51] Int. Cl.⁶ .................................................. B27B 9/04
[52] U.S. Cl. ..................... 83/471.3; 83/486.1; 83/574; 83/581
[58] Field of Search .................... 83/574, 581, 471.2, 83/486, 486.1, 487, 488, 489

[56] References Cited

U.S. PATENT DOCUMENTS

| | | |
|---|---|---|
| 2,596,524 | 5/1952 | Bridwell . |
| 2,714,903 | 8/1955 | Miller ..................... 83/574 X |
| 2,735,456 | 2/1956 | Grier et al. . |
| 2,739,624 | 3/1956 | Haddock . |
| 2,941,554 | 6/1960 | Long . |
| 3,130,758 | 4/1964 | McKinley . |
| 3,368,594 | 2/1968 | Drumbore ................ 83/574 X |
| 4,163,404 | 8/1979 | Lavis ...................... 83/486.1 X |
| 4,181,057 | 1/1980 | Bassett .................... 83/486.1 X |
| 4,237,762 | 12/1980 | Winter ..................... 83/486.1 X |
| 4,516,453 | 5/1985 | Parham, Jr. . |
| 4,545,274 | 10/1985 | Germond .................. 83/488 X |
| 4,840,097 | 6/1989 | Campbell ................. 83/486.1 X |

*Primary Examiner*—Rinaldi I. Rada
*Attorney, Agent, or Firm*—Edward A. Sokolski

[57] ABSTRACT

A slide plate is attached to a support member which is supported on a work bench for pivotal motion about a longitudinal axis. The slide plate is pivotally attached to such support member through a coupler to which a resilient vertical torquing force is applied by means of a spring member. This resilient force urges the slide plate pivotally upwardly to an angular position against a stop member where it is retained except when downward pressure is exerted thereagainst, as in sawing. The slide plate has an aperture therein such that a circular saw can be fitted in the aperture and slidably moved along the slide plate in performing a sawing operation. The slide plate support member is mounted on a work bench which has a fence member thereon for stopping the downward travel of the slide plate to provide a space between the slide plate and the work bench for the piece to be sawed. The angular position of the slide plate is set for sawing the piece at a selected angle by a hand crank which is used to drive the slide plate support member laterally relative to a pivot pin which is mounted on the work bench and extends through a slot in the slide plate.

11 Claims, 3 Drawing Sheets

PORTABLE POWER SAW GUIDE AND SUPPORT

BACKGROUND OF THE INVENTION

1. Field of the Invention

This invention relates to power saws and more particularly to a guide and support device for such a saw which facilitates the cutting of a work piece at any desired angle.

2. Description of the Related Art

It is highly desirable to have a guide for a circular power saw to facilitate the sawing of work pieces, which are usually pieces of lumber, at various angles. Guides have been developed in the prior art for this purposes such as described in U.S. Pat. No. 2,596,524 issued May 13, 1952 to Bridwell; U.S. Pat. No. 4,516,453 issued May 14, 1985 to Parham, Jr.; and U.S. Pat. No. 2,735,456 issued Feb. 21, 1956 to Grier, et al.

While the devices of the above patents all enable the sawing of a work piece at a desired angle, none provides a simple and accurate adjustment mechanism for achieving this end result. Bridwell while it has a spring mechanism for raising the saw guide above the piece to be sawed, in Bridwell, the angular position to which the saw can be set is limited to a selected series of spaced apart positions determined by positioning notches which engage a latch. The angle at which sawing can be done is thus limited to the selected positions determined by the notches. In the Grier patent, angular adjustment of the saw can be achieved but again only to preselected discrete positions determined by spaced apertures which are engaged by an adjustable plunger. While, Parham, Jr. has a pulley device for setting the sawing angle to any desired angle, this device is rather complicated and employs pulley cords in its implementation which are readily subject to breakage.

BRIEF SUMMARY OF THE INVENTION

The device of the present invention is a significant improvement over the prior art in providing a power saw guide which is of simple and durable constructions which can be rapidly and easily set in any desired angular position relative to the piece to be sawed. This end result is achieved by employing a slide plate for supporting and guiding the saw which is supported on a work bench for pivotal motion about a longitudinal axis on a support member. The slide plate is coupled to the support member at one end thereof by a spring urged coupler which resiliently drives the slide plate to an angulated upward position where it is retained against a stop member. At a point along the slide plate, spaced longitudinally from the coupler towards the opposite end thereof, such plate has a longitudinal slot into which a pivot pin fixedly mounted on the work bench is fitted. A hand driven crank which drives a geared coupling connected to the slide plate support member call be used to position the slide plate support member laterally relative to the fixed pivot pin such that the horizontal angle of the slide plate relative to the work bench can be precisely adjusted to any desired angular position. The saw is removably fitted into an aperture formed in the slide plate and mounted between a pair of rails so that the slide plate can be lowered against the resilient upward torque of the spring and the saw slid along the slide plate rails against the piece to be sawed so as to perform the sawing operation at the desired angle.

It is therefore an object of the invention to facilitate the sawing of a work piece at a precise desired angle with a portable saw.

It is a further object of the invention to provide a guide for a portable circular saw which facilitates the use of such saw in sawing a work piece at any desired angle.

Other objects of the invention will become apparent in connection with the following description in conjunction with the accompanying drawings.

DETAILED DESCRIPTION OF THE INVENTION

Referring to the Figures, a preferred embodiment of the invention is shown.

Figure 5:
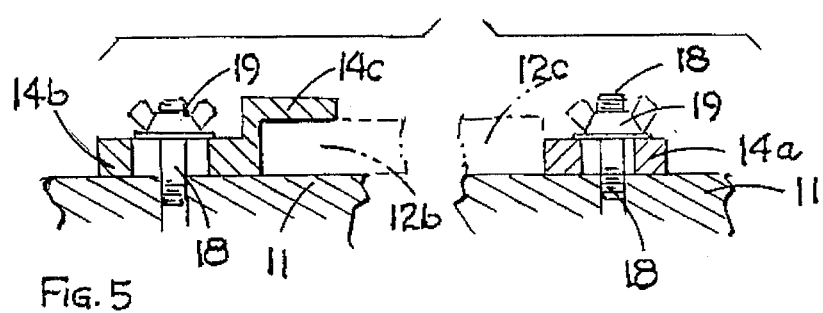
FIG. 5 is a cross sectional plan view of the first embodiment taken along the plane indicated by 5—5 in FIG. 1.
Figure 5A:
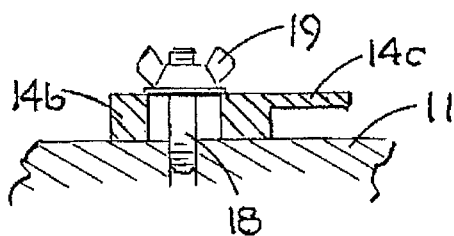
FIG. 5A is a cross sectional view of an alternate form of a portion of the guide plate shown in FIG. 5.

Slide plate 11 has an elongated aperture 11a formed therein. Circular saw 12 is slidably mounted on the slide plate with its saw blade 12a fitted through aperture 11a. The opposing sides 12b and 12c of the base of the saw abut against side rails 14a and 14b respectively. The side rails 14a and 14b are removably mounted on slide plate 11 by means of bolts 18 and wing nuts 19. Side rail 14b has a lip portion 14c which overlaps the side 12b of the of base of the saw and helps retain the saw to the slide. FIG. 5A illustrates an alternate form of rail 14b in which a smaller space is provided between lip portion 14c and the slide rail 11, this to accommodate a saw having a thinner base portion. In FIG. 5a, the same numerals are used to identify corresponding components shown in FIG. 5.

Figure 4:
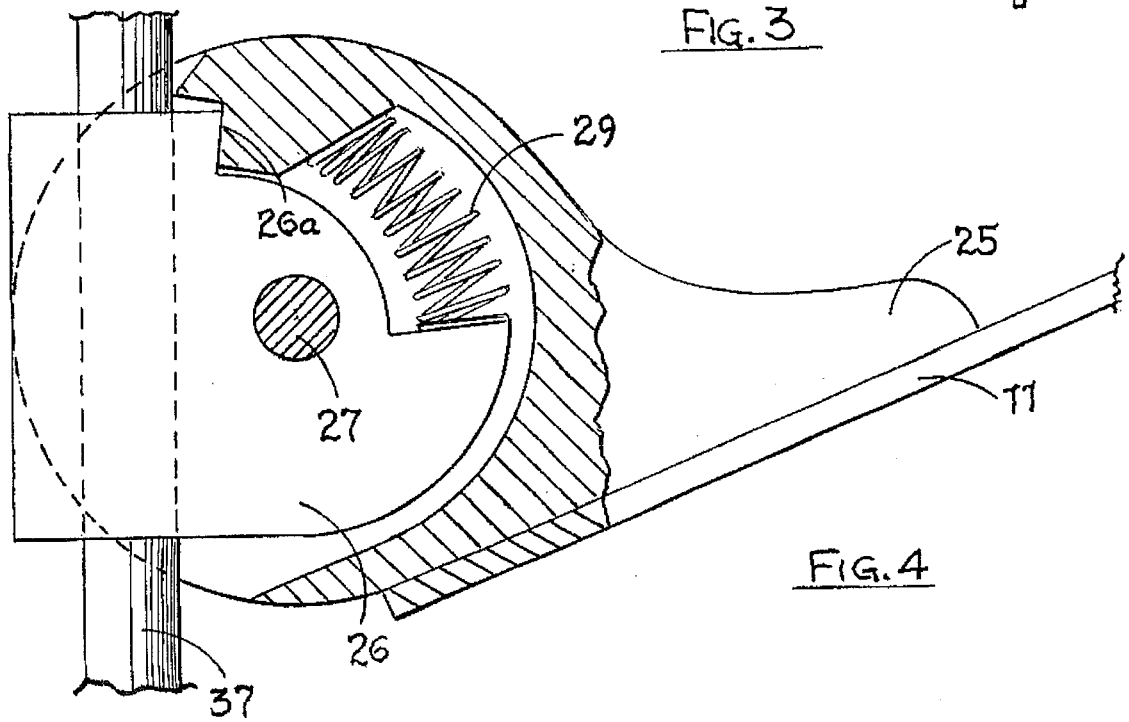
FIG. 4 is a right side elevational view of the coupler and support member of the first embodiment with a partial cutaway section.

Slide rail 11 is fixedly attached to a coupler member 25 which forms a lift arm for the slide rail. Coupler member 25 is pivotally supported on shaft 27, which is fixedly attached to support member 26. The coupler member is resiliently urged upwardly by coil spring 29 which is installed between inner opposing walls of the coupler and support members as can best be seen in FIG. 4. By virtue of the action of spring 29, slide rail 11 is normally retained in the upward position shown in FIG. 4 with the wall 26a of the support member abutting against the opposing wall of the coupler member and acting as a stop member.

Figure 2:
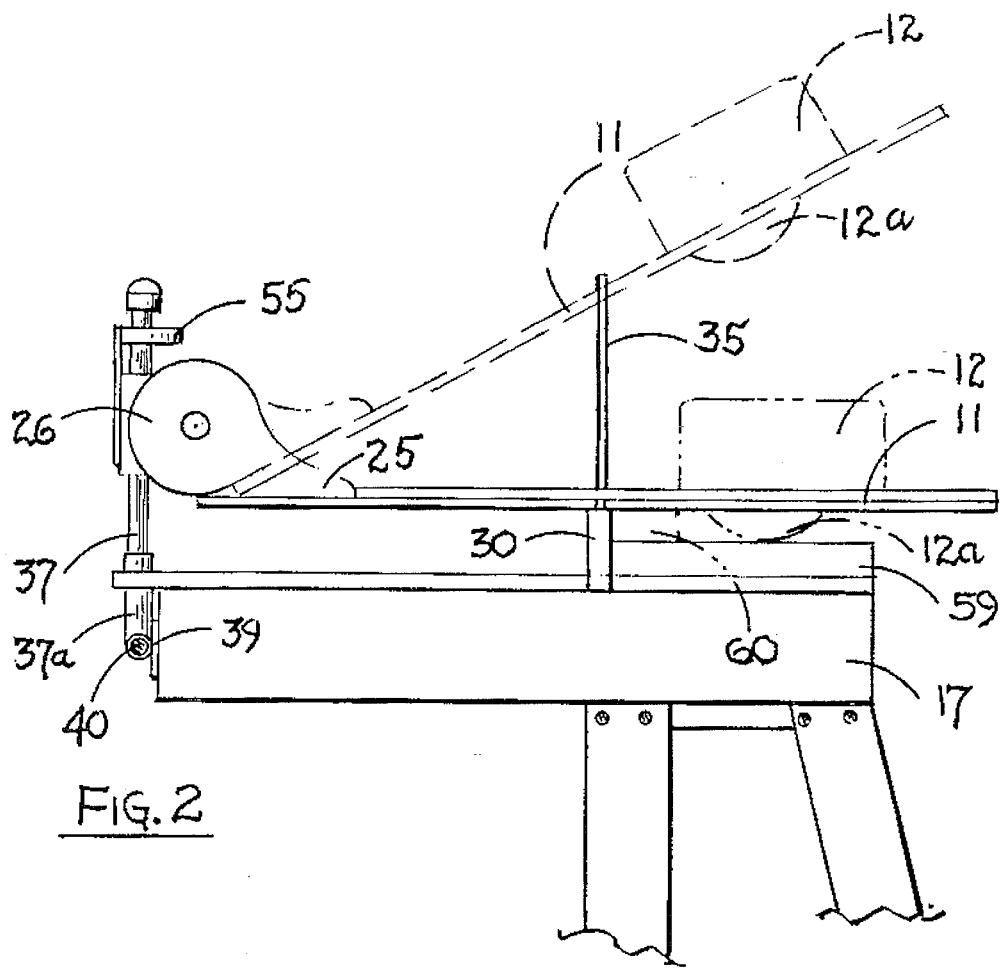
FIG. 2 is a side elevational view of the preferred embodiment.
Figure 6:
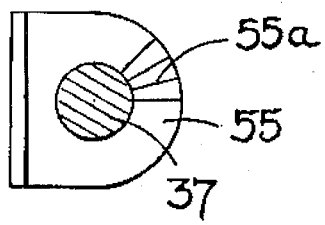
FIG. 6 is a top plan view of the positioning gauge of the preferred embodiment with the post cut away for convenience of illustration.
Figure 6A:
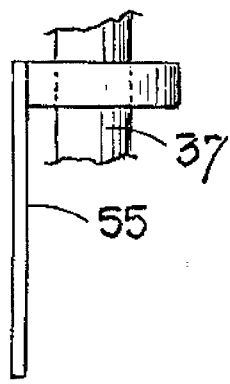
FIG. 6A is a side elevational view of the positioning gauge of FIG. 6.
Figure 7:
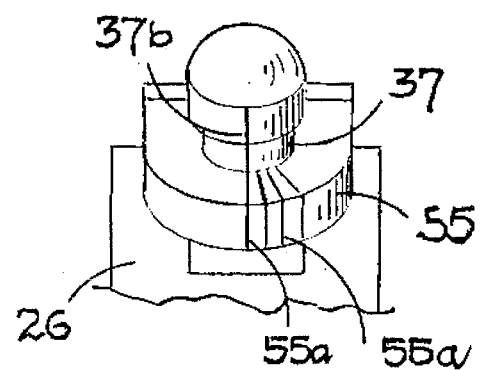
FIG. 7 is a top front perspective view of the positioning gauge of FIG. 6.

A fence 30 is fixedly attached to work bench 17 and extends upwardly therefrom. An opening 30a is provided in the central portion of fence 30 to accommodate the blade of the saw. Fence 30 acts as a downward positioning stop for the slide plate 11, as can be seen in FIG. 2.

Figure 3:
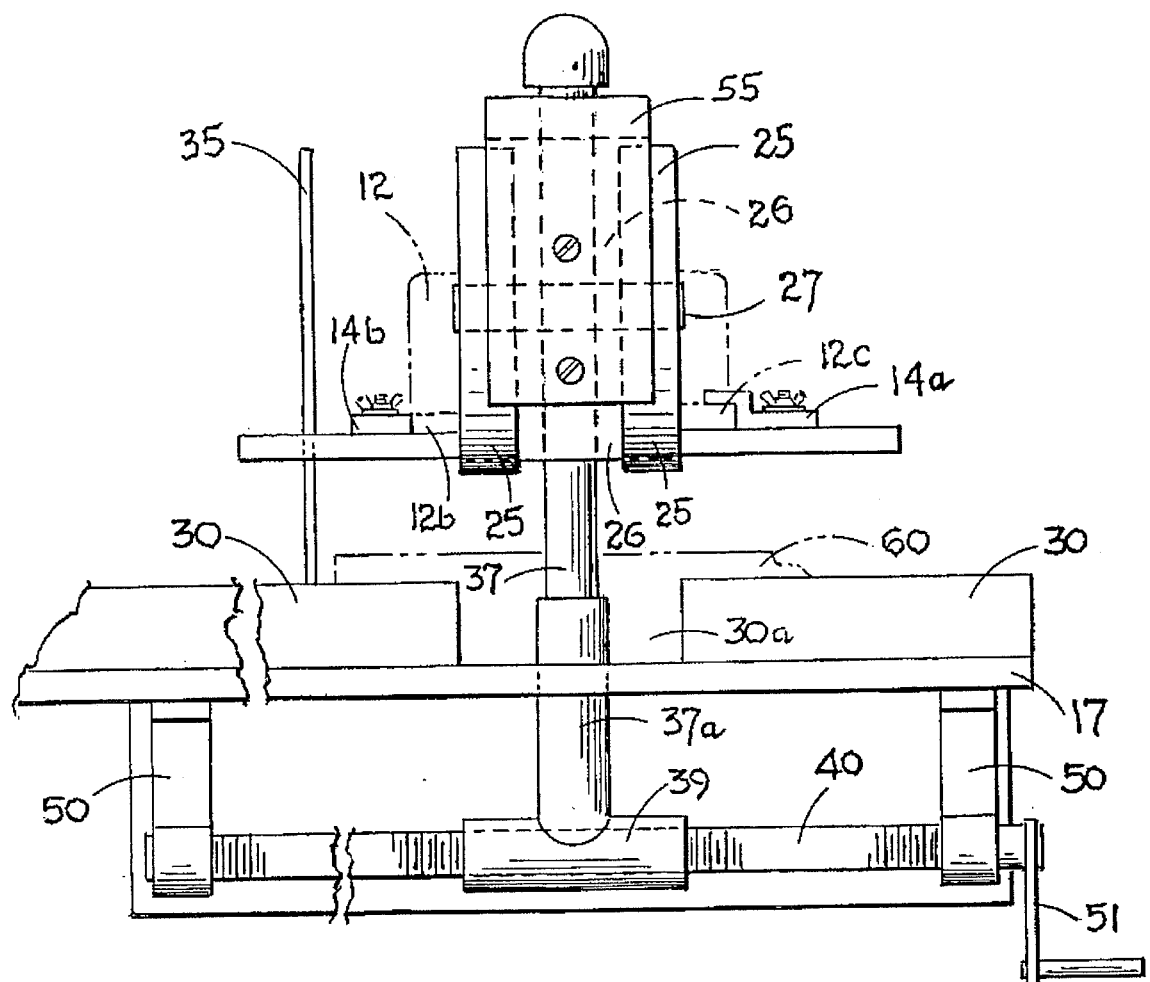
FIG. 3 is a rear elevational view of the preferred embodiment.

Pivot pin 35 is fixedly supported on fence 30 and is fitted through longitudinal slot 11b formed in slide plate 11. Support member 26 is pivotally supported on post 37. As best can be seen in FIG. 3, post 37 has an extension 37a which is fixedly attached to drive tube 39 which has a threaded interior which threadably engages drive rod 40. The drive rod is rotatably supported at its opposite ends on support brackets 50 which extend downwardly from work bench 17. Drive rod 40 is threaded throughout its length and can be rotatably driven in either direction by means of hand crank 51 which is attached to one of the ends thereof.

Figure 1:
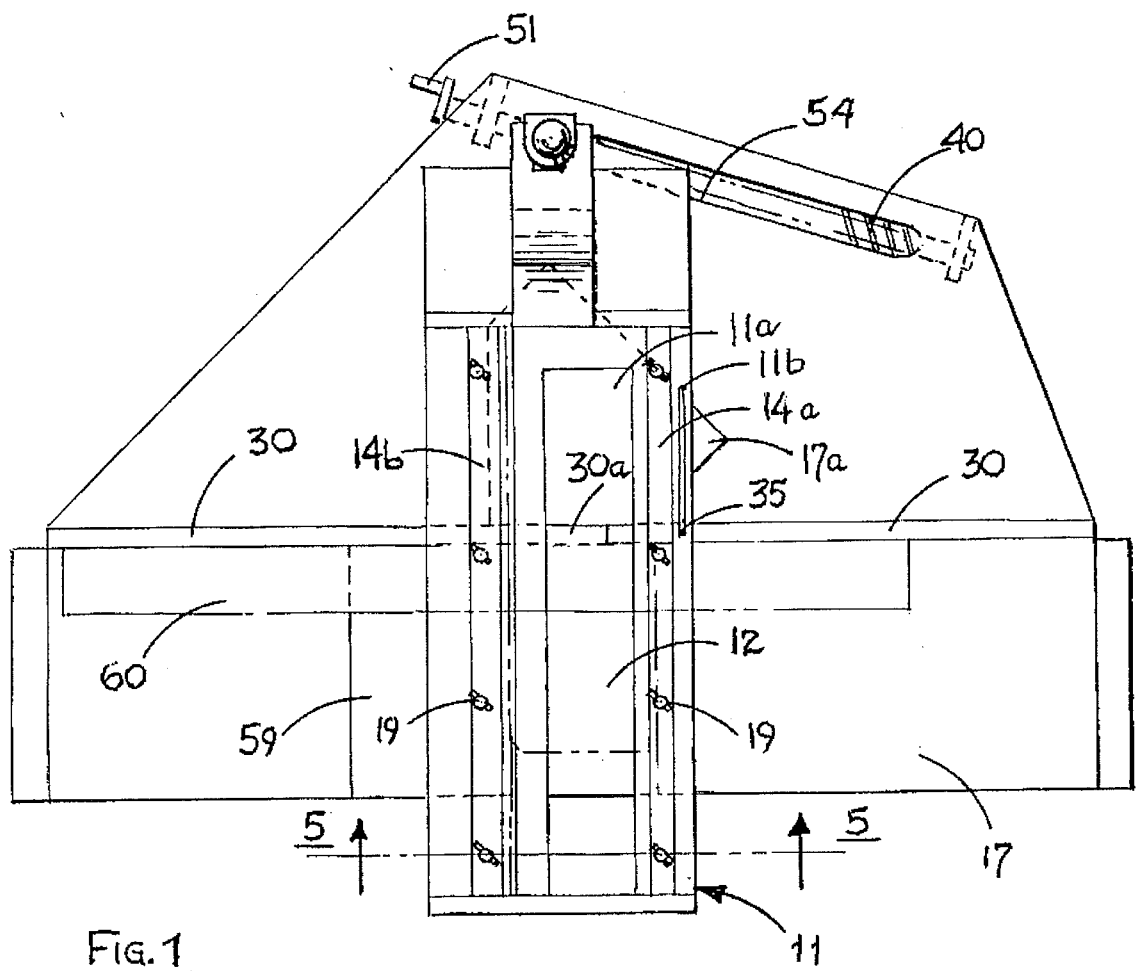
FIG. 1 is a top plan view of a preferred embodiment of the invention.

As can best be seen in FIGS. 1 & 3, the post extension 37a is fitted through longitudinal slot 54 formed in the work bench. As can be seen in FIG. 1, slot 54 runs substantially parallel to drive rod 40. Thus, as hand crank 51 is rotated in one direction, post extension 37a moves along the slot in a first direction and as the hand crank is rotated in an opposite direction post extension moves in an opposite direction. Post extension carries along with it post 37, support member 26, coupler 25 and the end of slide plate 11 attached to the coupler. As already noted, pivot pin 35, which is fixedly attached to the bench, is fitted through longitudinal slot 11b of the slide plate. Thus, the portion of the slide plate against which the pivot pin abuts is restrained against lateral motion. As the end of slide plate 11 is moved laterally, the horizontal angle of the slide plate relative to the work bench is changed. It is to be noted in this regard that support member 26 is rotatably mounted on post 37 so that it is free to move rotatably and vertically relative to the post with lateral and vertical motion thereof.

Gauge 55 is fixedly attached to the rear wall of support member 26, which as already noted is rotatably supported on post 37. This with lateral movement of the end of slide plate, gauge 55 moves rotatably relative to post 37. Gauge 55 has angular markers 55a thereon which are positioned relative to a marker 37b on post 37 to provide an indication of the relative angular position between the post and the gauge and thus the position of the slide plate relative to the work bench. Gauge 55a is accurately calibrated to provide a precise indication of this angular position.

In performing a sawing operation on a piece of lumber 60, this piece to be sawed is first placed on a backing board 59 on the work bench in a position alongside fence 30, as shown in FIGS. 1 and 2. The slide plate 11 will initially be in its normal upward position as indicated by the dotted lines in FIG. 2, this by virtue of the spring action already described in connection with FIG. 4. The hand crank 51 is then rotated to provide the desired angle at which the piece of lumber is to be sawed, this angular position being indicated on gauge 55. The saw is then installed on the slide plate along rails 14a and 14b and the slide plate then pushed down into position against fence 30. The cut is then made in normal fashion by activating the saw and slidably moving it through the wood piece 60 along the slide plate. It is to be noted that there is a space 30a in the fence and an opening 17a in the work bench to accommodate the final travel of the saw.

It should be apparent that the configuration of the slide plate can be modified slightly within the scope of the invention to accommodate different saws.

While the invention has been described and illustrated in detail, it is to be clearly understood that this is intended by way of example only and is not to be taken by way of limitation, the scope of the invention being limited only by the terms of the following claims.

I claim:

1. A device for guiding and supporting a power saw having a blade for use in the sawing of a piece of lumber on a work bench comprising:

a slide plate for supporting said saw slidably, means for supporting one end of said slide plate on said work bench for pivotal motion about a first axis substantially parallel to the top surface of said work bench, means for resiliently urging said means for supporting said one end of said slide plate about said first axis upwardly from the top surface of the work bench to a predetermined upward position, means for rotatably supporting said one end of said slide plate for pivotal motion about a second axis substantially normal to said first axis, means for restraining lateral motion of a portion of said slide plate spaced longitudinally from said one end thereof, and means for positioning said one end of said slide plate laterally relative to the top surface of said work bench while said spaced portion of said slide plate is being restrained to bring said slide plate and said saw to a desired angle laterally relative to the top surface of said work bench thereby positioning the saw for sawing lumber at said angle.

2. The device of claim 1 and further including slide rail means mounted on said slide plate for guiding the saw for slidable motion on said slide plate along a linear path.

3. The device of claim 1 wherein said means for supporting said one end of said slide plate for pivotal motion about a second axis comprises a post mounted substantially normal to the top surface of said work bench and a support member slidably supported on said post for pivotal and vertical motion relative thereto.

4. The device of claim 3 wherein said means for positioning said one end of said slide plate laterally comprises a threaded drive rod, a threaded drive tube attached to said post, said drive rod threadably engaging said drive tube, and a hand crank attached to said drive rod, whereby said hand crank can be employed to rotatably drive said drive rod to position said post to a desired position along said longitudinal slot.

5. The device of claim 1 and further including a fence fixedly attached to the work bench for providing a downward positioning stop for said slide plate, thereby spacing the blade of the saw from the top surface of said work bench.

6. The device of claim 1 wherein said means for arresting lateral motion of a portion of said slide plate comprises a pivot pin fixedly attached to said work bench, said slide plate having a longitudinal slot formed therein at said portion of said slide plate spaced from said one end thereof, said pivot pin being fitted in said slot.

7. A device for supporting and guiding a power saw having a blade for use in the sawing of a piece of lumber on a work bench comprising:

a slide plate having a longitudinal aperture formed therein for receiving the blade of the saw with the saw supported on the slide plate, coupler means for supporting said slide plate for pivotal motion about a first axis which is substantially parallel to the top surface of said work bench, support means for supporting said coupler means for pivotal motion about a second axis which is substantially normal to the top surface of said work bench, said coupler means being directly attached to said slide plate and supported for pivotal motion on said support means, spring means for resiliently urging said coupler means and the slide plate attached thereto pivotally upwardly about said first axis, stop means in said coupler means for arresting the upward pivotal motion of said coupler means, a pivot pin fixedly attached to said work bench, said slide plate having a longitudinal slot formed therein which is spaced from said one end thereof, said pivot pin being fitted in said slot, and means for driving said support means and said one end of said slide plate substantially laterally relative to said work bench and about said second axis while said pivot pin limits lateral movement of the portion of said slide plate having said slot formed therein, the position of said slide plate thereby being adjustable to a desired angle relative to the work bench to enable the sawing of said piece of lumber with said saw at said angle when said slide plate is lowered onto said work bench against the resilient upward urging of said spring means.

8. The device of claim 7 and further including slide rail means mounted on said slide plate for guiding the saw for slidable motion on said slide plate along a linear path.

9. The device of claim 7 wherein said support means comprises a post mounted substantially normal to the top surface of said work bench, and a support member slidably supported on said post for pivotal and vertical motion relative thereto, and a second longitudinal slot formed in said slide plate through which said post extends.

10. The device of claim 9 wherein said means for driving the support means comprises a threaded drive rod, a threaded drive tube attached to said post, said drive rod threadably engaging said drive tube, and a hand crank attached to said drive rod, whereby said hand crank can be employed to rotatably drive said drive rod to position said post to a desired position along said slot.

11. The device of claim 7 and further including fence means attached to the work bench for providing a downward positioning stop for said slide plate, thereby spacing the blade of the saw from the top surface of said work bench.

* * * * *